United States Patent [19]
Young et al.

[11] Patent Number: 5,574,869
[45] Date of Patent: Nov. 12, 1996

[54] BUS BRIDGE CIRCUIT HAVING CONFIGURATION SPACE ENABLE REGISTER FOR CONTROLLING TRANSITION BETWEEN VARIOUS MODES BY WRITING THE BRIDGE IDENTIFIER INTO CSE REGISTER

[75] Inventors: Bruce Young, Tigard; Gary Solomon, Hillsboro, both of Oreg.

[73] Assignee: Intel Corporation, Santa Clara, Calif.

[21] Appl. No.: 603,687

[22] Filed: Feb. 20, 1996

Related U.S. Application Data

[63] Continuation of Ser. No. 299,146, Aug. 31, 1994, abandoned, which is a continuation of Ser. No. 859,816, Mar. 30, 1992, abandoned.

[51] Int. Cl.$^6$ .................................................. G06F 13/36
[52] U.S. Cl. .................. 395/306; 364/240.2; 364/240.5; 364/242.92; 364/DIG. 1; 364/935.46; 364/926.91
[58] Field of Search ...................................... 395/800, 281, 395/284, 306, 309, 311, DIG. 1, DIG. 2

[56] References Cited

U.S. PATENT DOCUMENTS

| | | | |
|---|---|---|---|
| 3,962,685 | 6/1976 | Isle | 340/172.5 |
| 4,093,981 | 6/1978 | McAllister et al. | 395/575 |
| 4,475,189 | 10/1984 | Herr et al. | 370/62 |
| 4,593,352 | 6/1986 | Castel et al. | 395/275 |
| 4,803,623 | 2/1989 | Klashka et al. | 364/200 |
| 4,979,100 | 12/1990 | Makris et al. | 395/325 |
| 5,018,137 | 5/1991 | Backes et al. | 370/85.13 |
| 5,247,682 | 7/1993 | Kondou et al. | 395/700 |
| 5,280,480 | 1/1994 | Pitt et al. | 370/85.13 |
| 5,297,138 | 3/1994 | Black | 370/60 |
| 5,379,384 | 1/1995 | Solomon | 395/308 |
| 5,467,295 | 11/1995 | Young | 395/200.05 |

*Primary Examiner*—Meng-Ai T. An
*Attorney, Agent, or Firm*—Blakely, Sokoloff, Taylor & Zafman

[57] ABSTRACT

A configuration space enable/disable mechanism for transferring configuration data to and from peripheral components coupled to one or more peripheral component buses. Bridge circuits implement four configuration modes: a NORMAL mode, a BLOCK mode, a CONFIG mode, and a PASS mode. The configuration mode of each bridge circuit is controlled by writing to a configuration space enable (CSE) register. The BLOCK mode blocks predetermined types of accesses in order to allow configuration access through a peer bridge circuit. The CONFIG mode maps preselected types of accesses into configuration space accesses. The PASS mode passes the preselected types of accesses to the secondary bus to allow configuration space access through a bridge circuit in one of the lower levels of the hierarchy.

14 Claims, 3 Drawing Sheets

BUS BRIDGE CIRCUIT HAVING CONFIGURATION SPACE ENABLE REGISTER FOR CONTROLLING TRANSITION BETWEEN VARIOUS MODES BY WRITING THE BRIDGE IDENTIFIER INTO CSE REGISTER

This is a continuation of application Ser. No. 08/299,146, filed Aug. 31, 1994 now abandoned, which is a continuation of application Ser. No. 07/859,816, Mar. 30, 1992, now abandoned.

BACKGROUND OF THE INVENTION

1. Field of the Invention

This invention relates to the field of computer system architecture. More particularly, this invention relates to configuring peripheral components coupled to multiple peripheral component buses of a computer system.

2. Background

In a computer system, peripheral components such as disc drive controllers, network controllers, and graphics controllers, may be coupled to peripheral component buses separate from a main memory bus. A system may have one peripheral component bus for communication among all peripheral components, or may disperse the peripheral components among multiple peripheral component buses. A bridge circuit is used for communication between buses; either between a main memory bus and a peripheral component bus, or between two peripheral component buses.

There are several reasons a system might employ multiple peripheral component buses. For example, it may be desirable to isolate slower speed devices from higher bandwidth buses and peripherals. Also, an intelligent peripheral component may have a local peripheral component bus. Moreover, the system may have more peripheral components than can be reliably placed on one peripheral component bus, due to electrical loading effects.

A system with multiple peripheral component buses can be arranged in a hierarchical fashion, with the top level comprising the main memory bus. A bridge circuit is used to couple the main memory bus to a peripheral component bus on the second level. A second level peripheral component bus can be coupled through another bridge circuit to another peripheral component bus on the third level, and so on. Also, there may be more than one peripheral component bus on a given level, which means that there may be more than one bridge circuit coupled to a given bus.

To allow flexibility in coupling a variety of peripheral components to the peripheral component buses, it is desirable that a CPU be able to transfer configuration data to and from each of the peripheral components. This capability allows the CPU to control the address and I/O spaces of the peripheral components. In past systems, portions of memory or I/O address space have been dedicated to configuration areas on a component by component basis. However, these past methods reduce flexibility in placement of peripheral components on the peripheral component buses, since the dedicated configuration areas are likely to overlap.

As will be described, the present method and apparatus provides a configuration space enable/disable mechanism for transferring configuration data to and from peripheral components coupled to one or more peripheral component buses. The configuration space enable/disable mechanism allows flexible placement of peripheral components on the peripheral component buses.

SUMMARY OF THE INVENTION

A configuration space enable/disable mechanism for transferring configuration data to and from peripheral components coupled to one or more peripheral component buses is provided. Bridge circuits are used to perform communication between a primary and a secondary bus. Each bridge circuit implements a state machine that supports four operational states, or modes: a NORMAL mode, a BLOCK mode, a CONFIG mode, and a PASS mode. The configuration mode of each bridge circuit is controlled by writing to a configuration space enable (CSE) register. The CSE register is implemented on each of the bridge circuits, such that all the bridge circuits "listen" for writes to the CSE register on their primary bus.

The response of a bridge circuit to a write of the CSE register depends upon its current mode. After reset, the bridge circuit treats all primary bus I/O accesses, except writes to the CSE register, "normally". While the bridge circuit is in the NORMAL mode, if a write to the CSE register does not match the bridge circuit's assigned bridge number or reset value, it transitions to the BLOCK mode. In the BLOCK mode, the bridge circuit blocks a predetermined range of received I/O accesses from being propagated to the secondary bus. The BLOCK mode allows another bridge circuit to intercept those I/O accesses for configuration transfers. The bridge circuit remains in the BLOCK mode until a reset value is written to the CSE register, at which time the bridge circuit transitions back to the NORMAL mode.

While the bridge circuit is in the NORMAL mode, if a write to the CSE register does match the bridge circuit's assigned number, it transitions to the CONFIG mode. While in the CONFIG mode, the bridge circuit maps the predetermined range of received I/O accesses from the primary bus into configuration space accesses on the secondary bus. If a reset value is written to the CSE register while the bridge circuit is in the CONFIG mode, it transitions back to the NORMAL mode, thereby terminating configuration mapping.

While the bridge circuit is in the CONFIG mode, if a value other than the reset value is written to the CSE register, it transitions to the PASS mode. In the PASS mode, the bridge circuit propagates the predetermined range of received configuration I/O accesses onto the secondary bus. The PASS mode allows access of the configuration space for peripheral components at lower levels in the hierarchy. The bridge circuit remains in the PASS mode until the reset value is written to the CSE register, at which time the bridge circuit returns to the NORMAL mode.

DETAILED DESCRIPTION OF THE INVENTION

A configuration space enable/disable mechanism for transferring configuration data to and from peripheral components coupled to one or more peripheral component buses is disclosed. The following description, for purposes of explanation, specific circuit devices, circuit architectures and components, are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
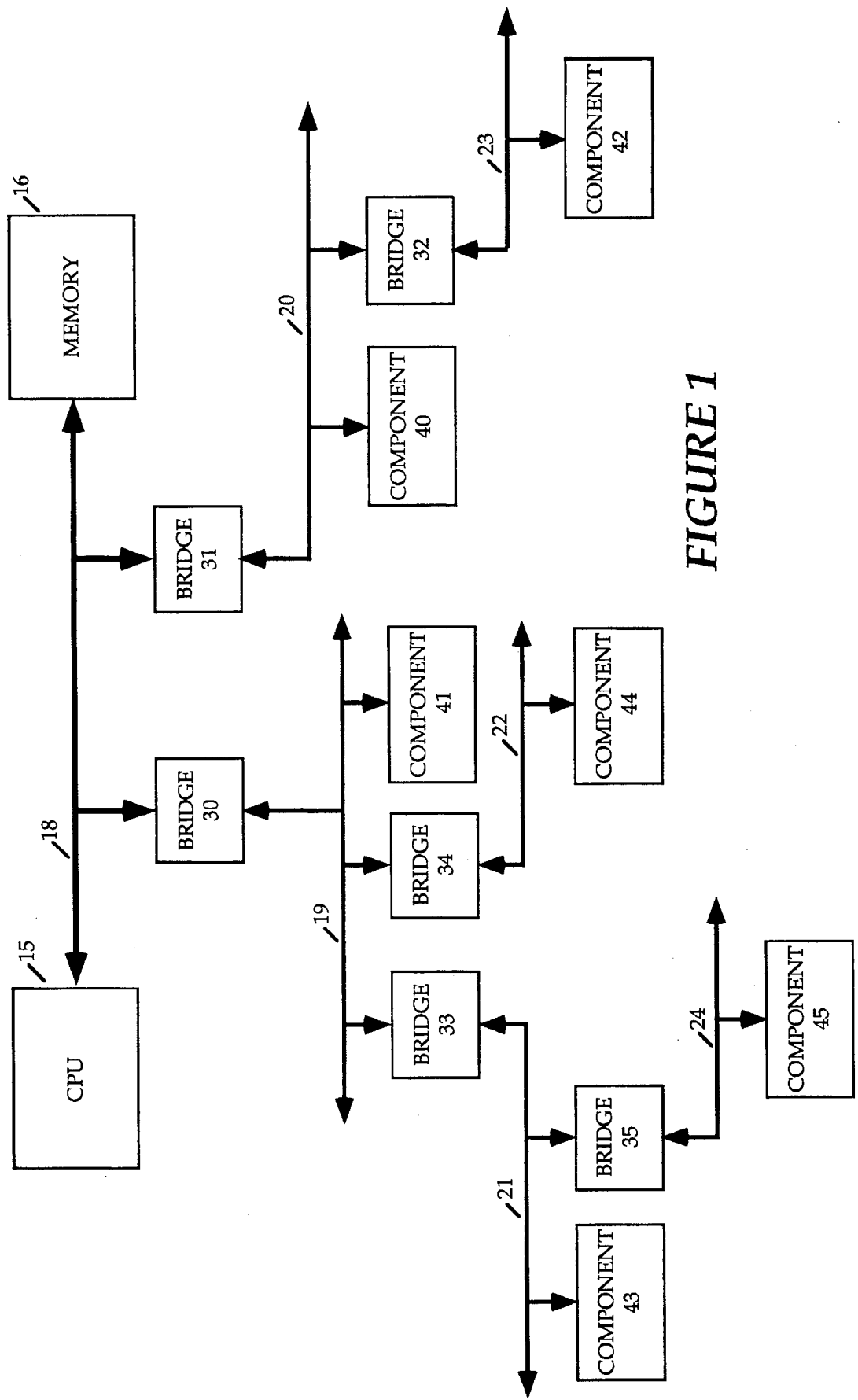
FIG. 1 shows a computer system employing the teachings of the present invention, including a hierarchical arrangement of peripheral component buses.

Referring to FIG. 1, a computer system employing the teachings of the present invention is illustrated, including a hierarchical arrangement of peripheral component buses. A CPU 15 is coupled to transfer information to and from a memory subsystem 16 over a memory bus 18. In the current embodiment, the memory bus 18 provides both a 32 bit memory address space, and a 16 bit I/O address space.

Buses 19–24 are peripheral component buses used for communication by peripheral components 40–45. In the current embodiment, the peripheral component buses 19–24 comprise 32 bit memory address and 32 bit I/O address spaces, with addresses and data multiplexed over the same bus lines. For a complete discussion of a peripheral component bus consistent with the teachings of the present invention, refer to related application Ser. No. 07/876,577, filed on Apr. 30, 1992 now U.S. Pat. No. 5,467,295, entitled A Signalling Protocol for a Peripheral Component Interconnect, and incorporated fully herein by reference.

The memory bus 18, along with the peripheral component buses 19–24 are arranged in a hierarchical fashion. The first level of the hierarchy is comprised of the main memory bus 18, and the second level is comprised of the peripheral component buses 19 and 20. A bridge circuit 30 enables communication between the memory bus 18 and the peripheral component bus 19. Similarly, a bridge circuit 31 enables communication between the memory bus 18 and the peripheral component bus 20.

The third level of the hierarchy is comprised of the peripheral component buses 21–23. A bridge circuit 33 enables communication between the peripheral component buses 19 and 21, a bridge circuit 34 enables communication between the peripheral component buses 19 and 22, and a bridge circuit 32 enables communication between the peripheral component buses 20 and 23. Finally, the fourth level of the hierarchy is comprised of the peripheral component bus 24, with a bridge circuit 35 providing communication between the peripheral component buses 21 and 24.

Bridge circuits at a given level of the hierarchy, which are coupled to a common bus, may be referred to as "peers". Thus, the bridge circuits 30 and 31 are peers. Similarly, the bridge circuits 33 and 34 are peers. Bridge circuits coupled to a common bus are either peers of each other, or are arranged hierarchically. For example, the bridge circuits 30 and 33 have a hierarchical arrangement, as do the bridge circuits 33 and 35.

Each of the bridge circuits 30–35 couple two buses, a primary bus and a secondary bus, in order to enable an access request that initiates on the primary bus to have a destination on the secondary bus, and enable an access request that initiates on the secondary bus to have a destination on the primary bus. For example, the bridge circuit 30 receives access requests over memory bus 18 (primary bus), and initiates peripheral component bus 19 (secondary bus) access requests to communicate with the peripheral component 41. Also, the bridge circuit 30 receives access requests over the peripheral component bus 19, and initiates access requests to communicate with the memory subsystem 16 over the memory bus 18.

Similarly, the bridge circuit 33 receives access requests over the peripheral component bus 19 (primary bus), and initiates peripheral component bus 21 (secondary bus) access requests to communicate with the peripheral component 43.

The peripheral components 40–45 are each coupled for communication over one of the peripheral component buses 19–24 as shown. In the current embodiment, the bridge circuits 30–35 do not perform address aliasing. Therefore, all memory and I/O addresses on the peripheral component buses 19–24 appear at the same address to the CPU 15, as well as to bus masters coupled to the peripheral component buses 19–24. As a consequence, addresses at lower levels may be hidden by address allocation at higher levels. For example, addresses allocated to the memory subsystem 16 cannot be used by the CPU 15 to access the peripheral components 40–45 on the lower levels of the hierarchy.

The configuration space enable/disable mechanism implemented on each of the bridge circuits 30–35 allows the CPU 15 to read configuration data from the peripheral components 40–45, and write configuration data to the peripheral components 40–45. As an example use for this mechanism, the CPU 15 can read configuration data from each of the peripheral components 40–45, and the bridge circuits 30–35 to determine addressing requirements, and subsequently write configuration data to the peripheral components 40–45, and the bridge circuits 30–35 to define memory address and I/O addressing allocation.

Figure 2:
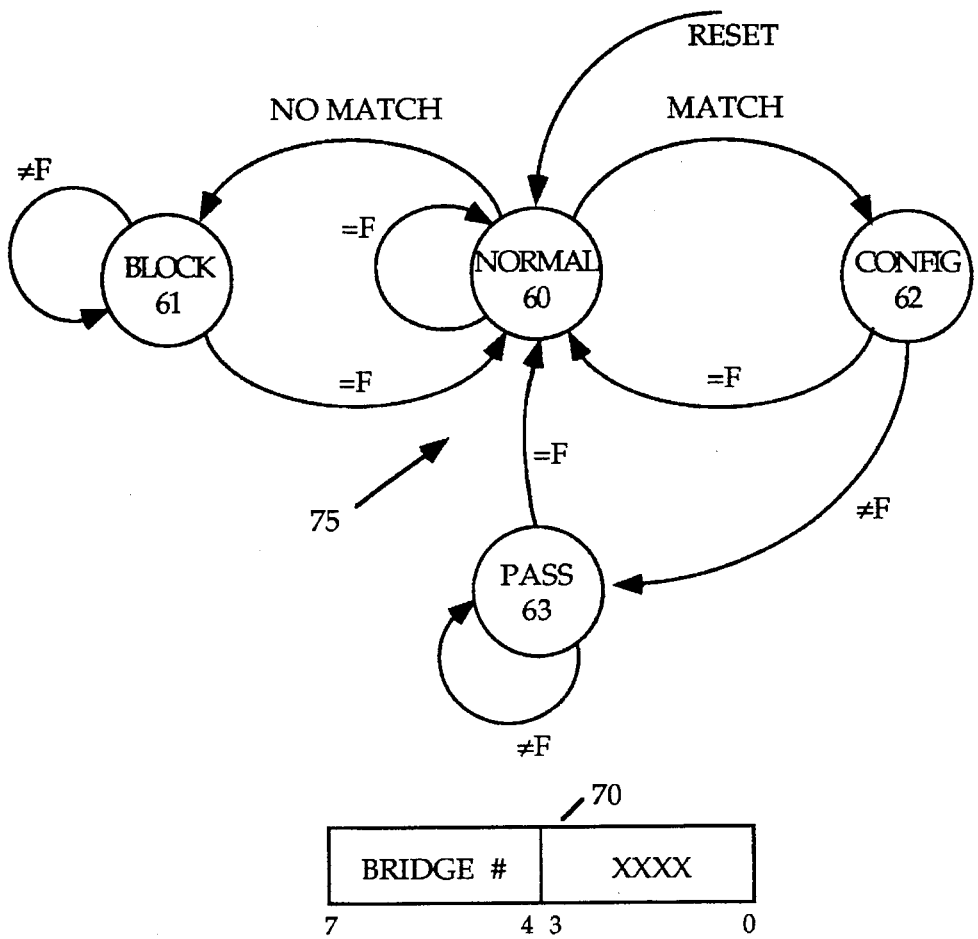
FIG. 2 shows a configuration space enable register, and provides a state diagram illustrating the operating modes of an example bridge circuit.

Referring to FIG. 2, a state diagram 75 illustrating operating modes of the configuration space enable/disable mechanism is shown, along with a configuration space enable (CSE) register 70. Each of the bridge circuits 30–35 implement four configuration operating modes: a NORMAL mode 60, a BLOCK mode 61, a CONFIG mode 62, and a PASS mode 63. The operating mode 60–63 of each bridge circuit 30–35 is controlled by writing to the bridge number field (BRIDGE#) of the CSE register 70. The lower 4 bits of CSE register 70 (XXXX) are "don't care" bits.

The CSE register 70 is implemented on each of the bridge circuits 30–35. The bridge circuits 30–35 normally "listen" for writes to the CSE register 70 on their primary bus, either the main memory bus 18 or one of the peripheral component buses 19–24. However, among bridge peers only one bridge circuit handshakes the CSE register 70 access. In the current embodiment, the CSE register 70 is mapped to I/O space at address 22 HEX. This address was chosen so as not to interfere with existing I/O address mapping.

The NORMAL mode 60 is the "normal" (i.e. non configuration) operating mode for the bridge circuits 30–35. In the BLOCK mode 61, preselected types of accesses received on the primary bus are "blocked" in order to allow configuration access through a peer bridge circuit. If there are no peer bridges then the block mode 61 is not required. In the CONFIG mode 62, the preselected types of accesses received on the primary bus are mapped to configuration space accesses on the secondary bus in order to access configuration areas of peripheral components. In the PASS mode 63, the preselected types of accesses received on the primary bus are passed, unaltered, to the secondary bus to allow configuration space access through a bridge circuit in one of the lower levels of the hierarchy.

As illustrated in the state diagram 75, the response of the bridge circuits 30–35 to a write of the CSE register 70 depends upon its current mode. After reset, the bridge circuits 30–35 enter NORMAL mode 60 and treat all accesses received on the primary bus, except writes to CSE register 70, "normally". "Normally" means that if a bridge circuit 30–35 is set up to accept an access, it passes the access onto the peripheral component bus as a peripheral component bus access. A bridge circuit 30–35 may be set up to normally ignore I/O accesses received on the primary bus.

When a write to the CSE register 70 is received over the primary bus while in the NORMAL mode 60, the most significant 4 bits of CSE register 70 (BRIDGE#) are compared the assigned bridge number. The assigned bridge number for the bridge circuits 30–35 can either be hardwired, configured on external pins, or assigned by the hardware at reset. All bridge circuits on a given bus must have an assigned unique bridge number.

If the BRIDGE# field of the CSE register 70 does not match the assigned bridge number, the bridge circuit 30–35 transitions to the BLOCK mode 61. In the BLOCK mode 61, I/O accesses received on the primary bus in the range C000 HEX through CFFF HEX (the predetermined types of accesses discussed above) are not propagated to the secondary bus. The BLOCK mode 61 allows a peer bridge circuit to intercept those I/O accesses for configuration transfers. The bridge circuit 30–35 remains in the BLOCK mode 61 until a reset value (F HEX) is written to the BRIDGE# field of the CSE register 70, at which time it transitions back to the NORMAL mode 60.

While in the NORMAL mode 60, if the BRIDGE# field of the CSE register 70 does match the assigned bridge number, The bridge circuit 30–35 transitions to the CONFIG mode 62. While in the CONFIG mode 62, the bridge circuit 30–35 accepts the predetermined types of I/O accesses over the primary bus, and maps those accesses into configuration space accesses onto the secondary bus. If the bridge circuit 30–35 receives 32 bit I/O addresses, then it maps received I/O accesses in the range FFFFC000 through FFFFCFFF HEX into configuration space accesses. On the other hand, if the bridge circuit 30–35 receives 16 bit I/O addresses, then it maps received I/O accesses in the range C000 through CFFF HEX into configuration space accesses.

Figure 3:
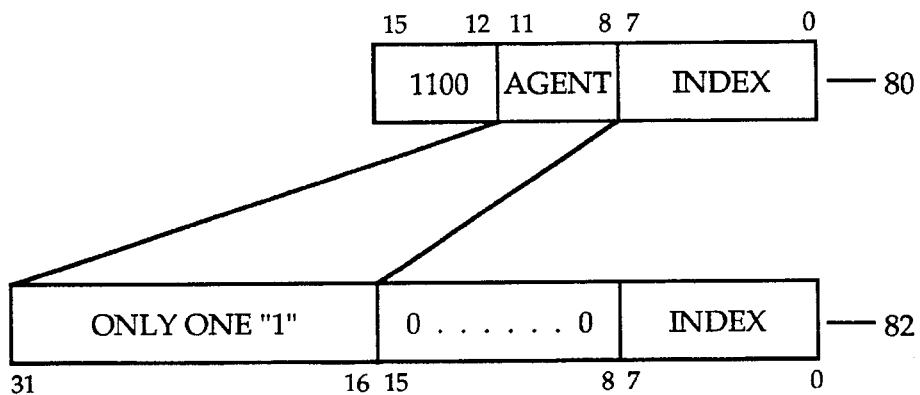
FIG. 3 illustrates a mapping of predetermined types of received primary bus accesses into secondary bus configuration space accesses that is performed by an example bridge circuit in CONFIG mode.

FIG. 3 illustrates the mapping of the predetermined I/O accesses into configuration space accesses of the CONFIG mode 62. Address 80 represents an I/O address in the range C000 through CFFF HEX generated by CPU 15. In the current embodiment, each of the peripheral components 40–45 and the bridge circuits 30–35 contains a set of up to 256 configuration space registers. Bits 0–7 of address 80 specify an index (INDEX) into the set of configuration space registers embedded within each of the peripheral components 40–45 and the bridge circuits 30–35. The AGENT field, bits 8–11, of address 80 specifies one of the peripheral components 40–45 or one of the bridge circuits 30–35. Since the AGENT field in the current embodiment is 4 bits, a maximum of $2^4$ or 16 peripheral components can be placed on one of the peripheral component buses 19–24.

While in the CONFIG mode 62, the bridge circuit 30–35 maps or translates the I/O address 80 received on the primary bus into a configuration space address 82 on the secondary bus. Bits 0–7 of the configuration space address 82 correspond to the INDEX field of the I/O address 80. Bits 8–15 of the configuration space address 82 are set to "0". Bits 16–31 of the configuration space address 82 are generated by decoding the AGENT field of the address 80. As a result of this decoding, only one bit of the bits 16–31 of the configuration space address 82 is set to "1". As will be described, the bits 16–31 of the configuration space address 82 can be used as chip selects for the peripheral components 40–45 and the bridge circuits 30–35, so long as the secondary bus cycle is a configuration read or write cycle.

While the bridge circuit 30–35 is in the CONFIG mode 62, if the reset value (equal to F HEX) is written to the BRIDGE# field of the CSE register 70, the bridge circuit transitions back to the NORMAL mode 60, thereby terminating configuration mapping. While the bridge circuit 30–35 is in the CONFIG mode 62, if a value other than the reset value is written to the BRIDGE# field of the CSE register 70, the bridge circuit transitions to the PASS mode 63. The PASS mode 63 allows access of the configuration space through bridge circuits at lower levels in the hierarchy.

In the PASS mode 63, the bridge circuit 30–35 accepts the predetermined types of accesses (I/C) accesses in the range C000 HEX through CFFF HEX) over the primary bus, and propagates those accesses unaltered to the secondary bus. In the PASS mode 63, the bridge circuit 30–35 drives the upper 16 bits of the secondary peripheral component bus address lines to FFFF HEX during the address phase of the secondary peripheral component bus I/C access. This ensures that the propagated access will not be interpreted as a real I/O access by the peripheral components 40–45 that may use the 00000000–0000FFFF HEX I/O address range. The bridge circuit 30–35 remains in the PASS mode 63 until the reset value F HEX is written to the BRIDGE# field of the CSE register 70.

If the bridge circuit 30–35 is in the NORMAL mode 60 or the BLOCK mode 61, it does not propagate an access of the CSE register 70. However, an access of the CSE register 70 is propagated in the CONFIG mode 62 or the PASS mode 63. To propagate an access of the CSE register 70, the bridge circuit 30–35 initiates an I/O write to the CSE register 70 on the secondary bus with the same data.

Figure 4:
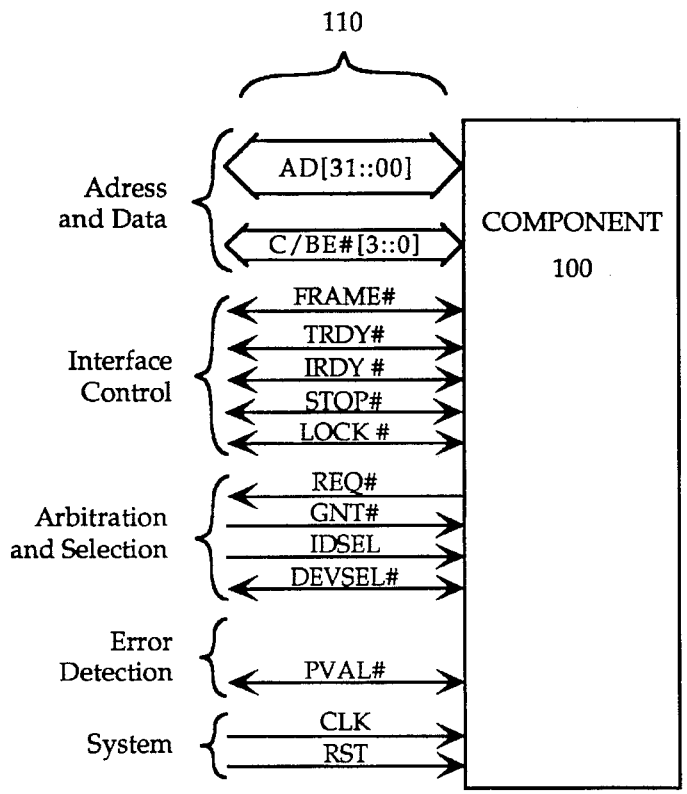
FIG. 4 provides an example of a peripheral component that is consistent with the teachings of the present invention, including the bus signals used for communication over an example peripheral component bus.

Referring to FIG. 4, an example peripheral component 100 that is consistent with the teachings of the present invention is illustrated. Bus signals 110 are carried over one of the peripheral component buses 19–24. Addresses and data are transferred at separate times over the 32 AD bus lines. The C/BE bus lines indicate bus command and byte enable information. Interface and control information is transferred over FRAME#, TRDY#, IRDY#, STOP#, and LOCK# bus signals. Bus arbitration and selection functions are provided by REQ#, GNT#, Identifier Select (IDSEL), and Device Select (DEVSEL#) bus signals. IDSEL functions as a configuration space select for the peripheral component 100. Synchronization is provided by a CLK bus signal. For a more detailed description of these bus signals, refer to related application Ser. No. 07/876,577, filed on Apr. 30, 1992, now U.S. Pat. No. 5,467,295 entitled A Signalling Protocol for a Peripheral Component Interconnect, and incorporated herein fully by reference.

The C/BE bus lines are used to indicate a configuration space read or write access over the secondary bus. The IDSEL bus signal for the peripheral component 100 is derived from bits 16–31 of the configuration space address 82 discussed above. The bridge circuits 30–35 can transmit up to sixteen separate IDSEL signals, for up to 16 peripheral components such as the peripheral component 100, over the upper sixteen bits of the AD bus signals. If the select signals are sent on the AD signal lines, then each of the peripheral components 40–45 and the bridge circuits 30–35 must have a unique bit of the upper 16 AD signal lines connected to its corresponding IDSEL input. Alternatively, 16 extra signal lines may be provided to carry the IDSEL signals.

Figure 5:
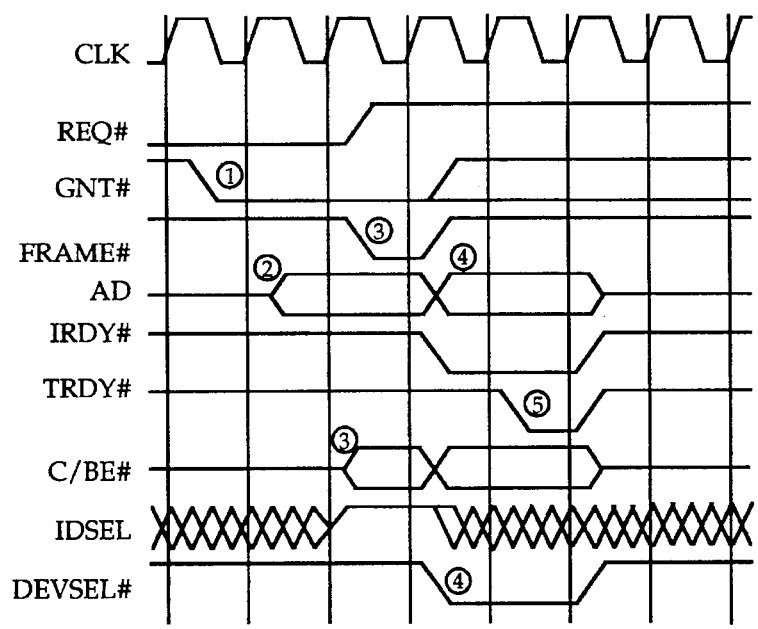
FIG. 5 illustrates the timing of a configuration space write cycle performed by a bridge circuit over the secondary bus while in the CONFIG mode.

FIG. 5 illustrates the timing of a configuration space write cycle performed by the bridge circuits 30–35 over the secondary bus while in the CONFIG mode 62. The GNT# signal becomes active at time 1. Once the bridge circuit 30–35 (the bus master) that is performing the configuration space write cycle senses that the bus is idle and samples GNT# active, it starts driving the FRAME#, AD, C/BE, and the IRDY# bus signals.

At time 2, the bus master asserts the desired IDSEL signal, by either asserting one of the upper sixteen bits of the AD bus signal lines, or by asserting a dedicated signal line. The bus master then asserts the FRAME# bus signal at time 3. Also at time 3, the bus master asserts the C/BE# to indicate a write configuration space access. Once the peripheral component 100 decodes the write configuration space access indicated by C/BE, it checks the state of its IDSEL, and asserts the DEVSEL# bus signal at time 4. Also at time 4, the bus master asserts the configuration data over the AD bus signal lines. The peripheral component 100 signals completion of the transaction at time 5 by asserting the TRDY# bus signal.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer system, comprising:

a central processing unit coupled to a system bus and configured to transfer a write transaction to a configuration space enable address over the system bus, the write transaction to the configuration space enable address containing a bridge identifier; and a bridge circuit coupled to the system bus and a peripheral component bus; said bridge circuit is configured to communicate with the system bus and said peripheral component bus; the bridge circuit having a set of operating modes including: a normal mode and a config mode; said normal mode for propagating read and write transactions between the system bus and the peripheral component bus, and said config mode for converting a read or write transaction of a predetermined configuration address space over the system bus into a read or write transaction of the predetermined configuration address space over the peripheral component bus; the bridge circuit includes a configuration space enable register having an assigned bridge number; the configuration space enable register is mapped to the configuration space enable address, such that when data is written to the configuration space enable address, the bridge identifier is written to the configuration space enable register, and the bridge circuit transitions from the normal mode to the config mode if the bridge identifier written to the configuration space enable register corresponds to the assigned bridge number for the bridge circuit.

2. The computer system of claim 1, wherein the operating modes include a block mode that configures the computer system to block the read or write transaction to the predetermined configuration address space over the system bus such that the bridge circuit enters the block mode if the bridge identifier written to the configuration space enable register does not correspond to the assigned bridge number for the bridge circuit.

3. The computer system of claim 2, wherein the computer system is configured such that when the bridge circuit is in the block mode, a reset identifier written to the configuration space enable register causes the bridge circuit to enter the normal mode.

4. The computer system of claim 1, wherein the computer system is configured such that when the bridge circuit is in the config mode and a second bridge identifier is written to the configuration space enable register, the bridge circuit enters a pass mode for propagating the read or write transaction to the predetermined configuration address space over the system bus into the read or write transaction to the predetermined configuration address space over the peripheral component bus.

5. The computer system of claim 4, wherein the computer system is configured such that when the bridge circuit is in the pass mode, a reset identifier written to the configuration space enable register causes the bridge circuit to enter the normal mode.

6. A computer system, comprising:

a central processing unit coupled to a system bus and configured to transfer a write transaction to a configuration space enable address over the system bus, the write transaction to the configuration space enable address containing a bridge identifier;

a first bridge circuit coupled to the system bus and a first peripheral component bus; said first bridge circuit is configured to communicate with the system bus and said first peripheral component bus; the first bridge circuit having a set of operating modes including: a normal mode and a config mode; said normal mode for configuring the computer system to propagate read and write transactions between the system bus and the first peripheral component bus, and said config mode for configuring the computer system to convert a read or write transaction of a predetermined configuration address space over the system bus into a read or write transaction of the predetermined configuration address space over the peripheral component bus; the first bridge circuit includes a first configuration space enable register having an assigned bridge number; the first configuration space enable register is mapped to the configuration space enable address, such that when data is written to the configuration space enable address, the bridge identifier is written to the first configuration space enable register, and the first bridge circuit transitions from the normal mode to the config mode if the bridge identifier written to the first configuration space enable register corresponds to the assigned bridge number for the first bridge circuit; and a second bridge circuit coupled to the system bus and a second peripheral component bus; said second bridge circuit is configured to communicate with the system bus and said second peripheral component bus; the second bridge circuit having the set of operating modes including: the normal mode and a block mode; said normal mode for configuring the computer system to propagate read and write transactions between the system bus and the second peripheral component bus, and said block mode for configuring the computer system to block the read or write transaction to the predetermined configuration address space received over the system bus; the second bridge circuit includes a second configuration space enable register having an assigned bridge number; the second configuration space enable register is mapped to the configuration space enable address, such that when data is written to the configuration space enable address, the bridge identifier is written to the second configuration space enable register, and the second bridge circuit transitions from the normal mode to the block mode if the bridge identifier written to the second configuration space enable register does not correspond to the assigned bridge number for the second bridge circuit.

7. The computer system of claim 6, wherein the central processing unit is configured to transfer a write transaction to the configuration space enable address containing a second bridge identifier over the system bus, such that the second bridge identifier written to the first configuration space enable register causes the first bridge circuit to enter a pass mode to propagate the read or write configuration transaction to the predetermined configuration address space received over the system bus to the first peripheral component bus.

8. The computer system of claim 7, wherein the first bridge circuit is configured to propagate the write transaction to the configuration space enable address received over the system bus to the first peripheral component bus while the first bridge circuit is in the pass mode.

9. The computer system of claim 7, wherein the central processing unit is configured to transfer the write transaction to the configuration space enable address containing a reset identifier over the system bus, such that the reset identifier written to the first and the second configuration space enable registers causes the first and the second bridge circuits to each enter the normal mode.

10. A configuration access method in a computer system, comprising the steps of:

transferring a write transaction containing a bridge identifier to a configuration space enable address from a central processing unit coupled to a system bus; said write transaction targets a configuration space enable register in a bridge circuit; said bridge circuit coupled to the system bus and a peripheral component bus; the bridge circuit having a set of operating modes including: a normal mode and a config mode; said normal mode for propagating read and write transactions between the system bus and the peripheral component bus, and said config mode for converting a read or write transaction of a predetermined configuration address space over the system bus into a read or write transaction of the predetermined configuration address space over the peripheral component bus; the bridge circuit further includes a configuration space enable register having an assigned bridge number; and causing the bridge circuit to transition from the normal mode to the configuration mode if the bridge identifier written to the configuration space enable register corresponds to the assigned bridge number for the bridge circuit.

11. The method of claim 10, wherein the operating modes include a block mode for blocking the read or write transaction to the predetermined configuration address space over the system bus such that the bridge circuit enters the block mode if the bridge identifier written to the configuration space enable register does not correspond to the assigned bridge number for the bridge circuit.

12. The method of claim 11, further comprising the step of causing the bridge circuit to be placed in the normal mode by transferring a reset identifier over the system bus while the bridge circuit is in the block mode.

13. The method of claim 10, further comprising the step of causing the bridge circuit to transition into a pass mode by transferring a second bridge identifier to the configuration space enable address over the system bus while the bridge circuit is in the config mode, the pass mode being used for propagating the read or write transaction to the predetermined configuration address space over the system bus into the read or write transaction to the predetermined configuration address space over the peripheral component bus.

14. The method of claim 13, further comprising the step of causing the bridge circuit to transition into the normal mode by transferring a reset identifier to the configuration space enable register, thereby causing the bridge circuit to enter the normal mode.

* * * * *

UNITED STATES PATENT AND TRADEMARK OFFICE
CERTIFICATE OF CORRECTION

PATENT NO.   : 5,574,869
DATED        : November 12, 1996
INVENTOR(S)  : Young et al.

It is certified that error appears in the above-identified patent and that said Letters Patent is hereby corrected as shown below:

In column 6 at line 24 delete "(I/C) accesses" and insert --(I/O accesses--

In column 6 at line 30 delete "I/C)" and insert --I/O--

Signed and Sealed this

Fifteenth Day of April, 1997

Attest:

BRUCE LEHMAN

Attesting Officer

Commissioner of Patents and Trademarks